United States Patent
Dodge et al.

(10) Patent No.: US 10,115,174 B2
(45) Date of Patent: Oct. 30, 2018

(54) SYSTEM AND METHOD FOR FORWARDING AN APPLICATION USER INTERFACE

(71) Applicant: 2236008 Ontario Inc., Waterloo (CA)

(72) Inventors: Danny Thomas Dodge, Ottawa (CA); Etienne Belanger, Kanata (CA); Jason Robert Mawdsley, Ottawa (CA)

(73) Assignee: 2236008 Ontario Inc., Waterloo (CA)

( * ) Notice: Subject to any disclaimer, the term of this patent is extended or adjusted under 35 U.S.C. 154(b) by 6 days.

(21) Appl. No.: 14/034,923

(22) Filed: Sep. 24, 2013

(65) Prior Publication Data
US 2015/0084971 A1    Mar. 26, 2015

(51) Int. Cl.
| | |
|---|---|
| *G06F 9/451* | (2018.01) |
| *G06T 1/20* | (2006.01) |
| *G06F 9/48* | (2006.01) |
| *G06F 9/44* | (2018.01) |

(52) U.S. Cl.
CPC .............. *G06T 1/20* (2013.01); *G06F 9/4445* (2013.01); *G06F 9/452* (2018.02); *G06F 9/4856* (2013.01)

(58) Field of Classification Search
None
See application file for complete search history.

(56) References Cited

U.S. PATENT DOCUMENTS

| | | | |
|---|---|---|---|
| 6,687,762 B1 | 2/2004 | Van Gaasbeck et al. | |
| 8,115,773 B2 | 2/2012 | Swift et al. | |
| 8,495,625 B1 * | 7/2013 | Sanders | G06F 8/60 717/174 |
| 8,922,569 B1 | 12/2014 | Tidd | |
| 9,061,207 B2 * | 6/2015 | Perlman | A63F 13/12 |
| 9,106,649 B2 * | 8/2015 | Binyamin | H04L 67/16 |
| 2004/0010561 A1 | 1/2004 | Kim et al. | |
| 2005/0131962 A1 | 6/2005 | Deshpande | |

(Continued)

FOREIGN PATENT DOCUMENTS

| | | |
|---|---|---|
| EP | 0371229 A2 | 6/1990 |
| WO | WO 2011/072993 A3 | 6/2011 |

OTHER PUBLICATIONS

"The Complete Guide to Speeding Up Your Virtual Machines" https://www.howtogeek.com/124796/the-htg-guide-to-speeding-up-your-virtual-machines/ (Year: 2012).*

(Continued)

*Primary Examiner* — Jennifer N To
*Assistant Examiner* — Beau D Spratt
(74) *Attorney, Agent, or Firm* — Rowand LLP

(57) ABSTRACT

A system and method for forwarding an application user interface from a first computing platform to a second computing platform. The application user interface is generated using source content. The application user interface is encoded into two or more encoded content streams where the two or more encoded content streams contain source content representable as the application user interface and composition metadata associated with the application user interface. The two or more encoded content stream are sent to the second computing platform. The two or more encoded content streams may be received at the second computing platform where the two or more encoded content streams contain information decodable and reproducible as the application user interface.

18 Claims, 10 Drawing Sheets

(56) References Cited

U.S. PATENT DOCUMENTS

| | | | |
|---|---|---|---|
| 2007/0174429 A1* | 7/2007 | Mazzaferri | G06F 3/1415 709/218 |
| 2008/0111822 A1 | 5/2008 | Horowitz et al. | |
| 2008/0316218 A1 | 12/2008 | Kilani et al. | |
| 2009/0089453 A1 | 4/2009 | Bohan et al. | |
| 2009/0115901 A1 | 5/2009 | Winter et al. | |
| 2009/0204711 A1* | 8/2009 | Binyamin | H04L 67/16 709/226 |
| 2009/0265422 A1* | 10/2009 | Park | G06F 9/4445 709/203 |
| 2009/0293055 A1* | 11/2009 | Carroll et al. | 718/1 |
| 2009/0305790 A1 | 12/2009 | Lu et al. | |
| 2010/0262992 A1 | 10/2010 | Casagrande | |
| 2011/0078532 A1* | 3/2011 | Vonog et al. | 714/752 |
| 2011/0138295 A1* | 6/2011 | Momchilov et al. | 715/740 |
| 2011/0157196 A1 | 6/2011 | Nave et al. | |
| 2011/0175923 A1 | 7/2011 | Mahajan et al. | |
| 2011/0270991 A1 | 11/2011 | Zawacki et al. | |
| 2011/0279635 A1 | 11/2011 | Periyannan et al. | |
| 2012/0069036 A1 | 3/2012 | Dharmapurikar | |
| 2012/0072898 A1* | 3/2012 | Pappas | G06F 21/10 717/171 |
| 2012/0311024 A1 | 12/2012 | Burckhardt | |
| 2013/0047074 A1 | 2/2013 | Vestergaard et al. | |
| 2013/0063489 A1 | 3/2013 | Hourie | |
| 2013/0093776 A1* | 4/2013 | Chakraborty | G06F 9/505 345/520 |
| 2013/0191722 A1 | 7/2013 | Gibbs et al. | |
| 2013/0204927 A1 | 8/2013 | Kruglikov et al. | |
| 2013/0227616 A1 | 8/2013 | Kruglikov et al. | |
| 2014/0028779 A1 | 1/2014 | Minemura | |
| 2014/0029764 A1* | 1/2014 | Park | H03G 1/00 381/104 |
| 2014/0122659 A1 | 5/2014 | Kaul et al. | |
| 2014/0208379 A1 | 7/2014 | Sinha et al. | |
| 2014/0333639 A1 | 11/2014 | Dodge et al. | |
| 2014/0333640 A1 | 11/2014 | Dodge et al. | |
| 2014/0333641 A1 | 11/2014 | Dodge et al. | |
| 2014/0337818 A1 | 11/2014 | Dodge et al. | |
| 2015/0032812 A1* | 1/2015 | Dudley | 709/204 |
| 2015/0084971 A1 | 3/2015 | Dodge et al. | |
| 2015/0089367 A1 | 3/2015 | Dodge et al. | |

OTHER PUBLICATIONS

European Search Report for corresponding European Application No. 14186181.5 dated Mar. 24, 2015, 6 pages.

European Search Report for corresponding European Application No. 14186182.3 dated Apr. 27, 2015, 6 pages.

Extended European Search Report, dated Jan. 15, 2014, pp. 1-6, European Application No. 13167544.9, European Patent Office, Rijswijk, The Netherlands.

Extended European Search Report, dated Jan. 15, 2014, pp. 1-6, European Application No. 13167543.1, European Patent Office, Rijswijk, The Netherlands.

Extended European Seach Report, dated Jul. 24, 2014, pp. 1-9, European Application, European Application No. 14167646.0, European Patent Office, Rijswijk, The Netherlands.

Application as filed for U.S. Appl. No. 13/893,025, filed May 13, 2013 entitled "System and Method for Forwarding a Graphics Command Stream," pp. 1-36.

Application as filed for U.S. Appl. No. 13/892,995, filed May 13, 2013 entitled "System and Method for Forwarding a Graphics Command Stream," pp. 1-35.

A. Jurgelionis et al., "Platform for Distributed 3D Gaming," dated Jan. 1, 2009, pp. 1-15, International Journal of Computer Games Technology, Hindawi Publishing Corporation.

Extended European Search Report, dated Sep. 10, 2014, pp. 1-8, European Application No. 14167647.8, European Patent Office, Munich, Germany.

Non-Final Office Action, dated Apr. 9, 2015, pp. 1-19, U.S. Appl. No. 13/893,025, US Patent and Trademark Office, Alexandria, VA.

European Examination Report, dated Sep. 3, 2015, pp. 1-2, European Application No. 14167647.8, European Patent Office, Munich, Germany.

Application as filed for U.S. Appl. No. 14/274,386, filed May 9, 2014, entitled System and Method for Forwarding a Graphics Command Stream, pp. 1-39.

Non-Final Office Action, dated Jan. 29, 2015, pp. 1-27, U.S. Appl. No. 14/274,403, US Patent and Trademark Office, Alexandria, VA.

Final Office Action, dated Aug. 17, 2015, pp. 1-20, issued in U.S. Appl. No. 13/893,025, US Patent and Trademark Office, Alexandria, VA.

Non-Final Office Action, dated Jun. 2, 2015, pp. 1-16, U.S. Appl. No. 14/035,286, US Patent and Trademark Office, Alexandria, VA.

Final Office Action, dated Dec. 3, 2015, pp. 1-25, U.S. Appl. No. 14/035,286, US Patent and Trademark Office, Alexandria, VA.

Non-Final Office Action, dated Apr. 19, 2016, pp. 1-23, U.S. Appl. No. 14/035,286, US Patent and Trademark Office, Alexandria, VA.

Final Office Action, dated Oct. 18, 2016, pp. 1-25, U.S. Appl. No. 14/035,286, US Patent and Trademark Office, Alexandria, VA.

Non-Final Office Action, dated May 24, 2017, pp. 1-36, U.S. Appl. No. 14/035,286, US Patent and Trademark Office, Alexandria, VA.

Non-Final Office Action, dated Jul. 2, 2015, pp. 1-17, U.S. Appl. No. 14/034,923, US Patent and Trademark Office, Alexandria, VA.

Final Office Action, dated Dec. 1, 2015, pp. 1-20, U.S. Appl. No. 14/034,923, US Patent and Trademark Office, Alexandria, VA.

Non-Final Office Action, dated Jul. 26, 2016, pp. 1-21, U.S. Appl. No. 14/034,923, US Patent and Trademark Office, Alexandria, VA.

Final Office Action, dated Jan. 13, 2017, pp. 1-27, U.S. Appl. No. 14/034,923, US Patent and Trademark Office, Alexandria, VA.

Final Office Action, dated Jun. 4, 2015, pp. 1-27, U.S. Appl. No. 14/274,403, US Patent and Trademark Office, Alexandria, VA.

Non-Final Office Action, dated Apr. 25, 2016, pp. 1-17, U.S. Appl. No. 13/893,025, US Patent and Trademark Office, Alexandria, VA.

Non-Final Office Action, dated Jul. 16, 2015, pp. 1-13, U.S. Appl. No. 13/892,995, US Patent and Trademark Office, Alexandria, VA.

Final Office Action, dated Nov. 24, 2015, pp. 1-15, U.S. Appl. No. 13/892,995, US Patent and Trademark Office, Alexandria, VA.

Non-Final Office Action, dated Sep. 27, 2016, pp. 1-18, U.S. Appl. No. 14/274,386, US Patent and Trademark Office, Alexandria, VA.

Final Office Action, dated Dec. 20, 2017, pp. 1-48, U.S. Appl. No. 14/035,286, US Patent and Trademark Office, Alexandria, VA.

EPO, EP Examiner's Report relating to EP application No. 14186181. 5, dated Jun. 22, 2018.

EPO, EP Examiner's Report relating to EP application No. 14186182. 3, dated Jun. 25, 2018.

USPTO, Office Action relating to U.S. Appl. No. 14/035,286 dated Aug. 16, 2018.

* cited by examiner

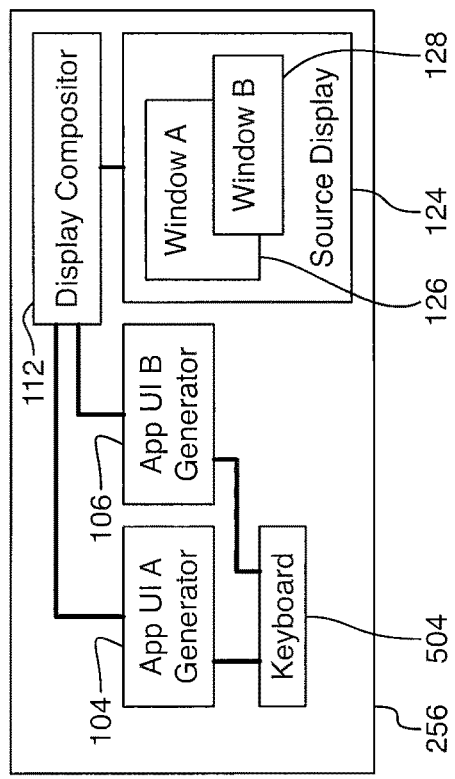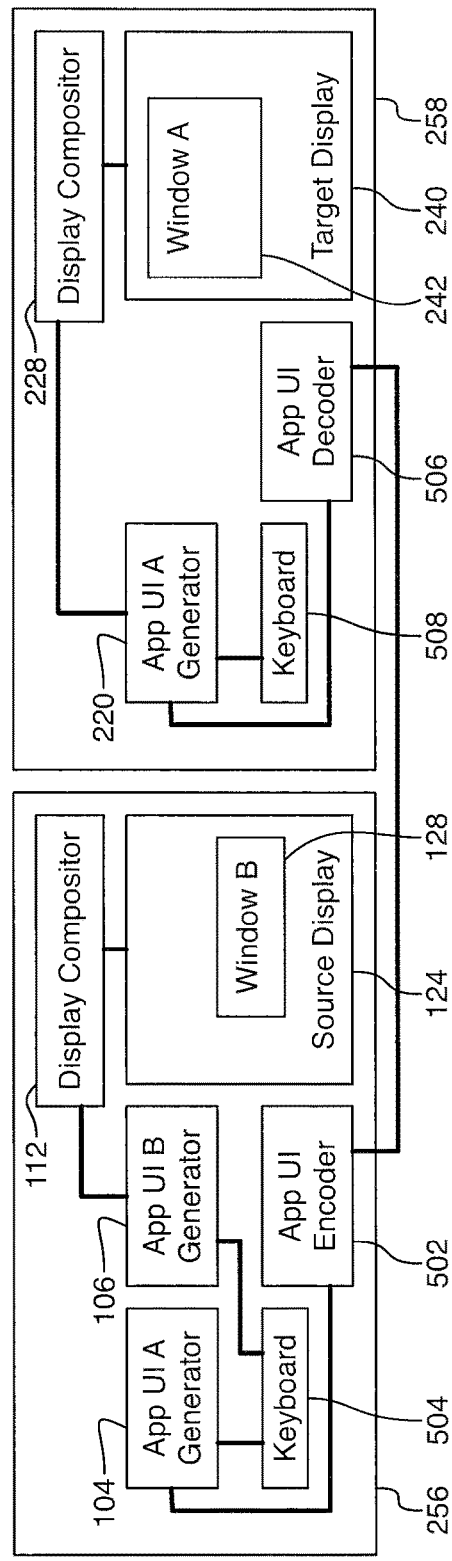
Figure 5A
Figure 5B

SYSTEM AND METHOD FOR FORWARDING AN APPLICATION USER INTERFACE

BACKGROUND

1. Technical Field

The present disclosure relates to the field of generating application user interfaces. In particular, to a system and method for forwarding an application user interface.

2. Related Art

Efficiently transmitting application content from a source device for display on a destination device is possible using a combination of networking and audio/video compression technologies. Typically, a source device (mobile phone, multimedia player, etc.) creates content (game, movie, user interface, etc.) that is compressed with an encoder and transmitted to the target device (television, receiver, etc.) over a wired or wireless network. The target device decodes the compressed content and reproducing the content on the target device. Compression is utilized because some networking technologies may not be fast enough (e.g. not have sufficient bandwidth) to transport raw uncompressed content.

In many applications the combination of wireless network and compression works well. For example, watching a movie stored on a local source device on a large display connected to a target device. There are a number of potential drawbacks related to the described wireless system including overall end-to-end latency and quality. Both the encoder and decoder introduce latency to lower the bitrate transmitted over the wireless network and the destination device typically introduces buffering to provide a smooth playback experience. The delay may be noticeable. The compression system reduces the transmission throughput requirement by lowering the quality of the content. Complex and fast motion graphics may appear degraded on the destination display in addition to having a noticeable delay.

The compression system may transmit the composited graphics and composited audio associated with the application user interface. It is desirable to have a mechanism for having an application user interface generated on a first platform displayed on a second platform while mitigating issues such as those relating to latency and image quality described above where each application user interface may be independently composited on the second platform.

BRIEF DESCRIPTION OF DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

FIG. 5A is a further schematic representation of a system for forwarding an application user interface.

FIG. 5B is a further schematic representation of a system for forwarding an application user interface.

DETAILED DESCRIPTION

Figure 1:
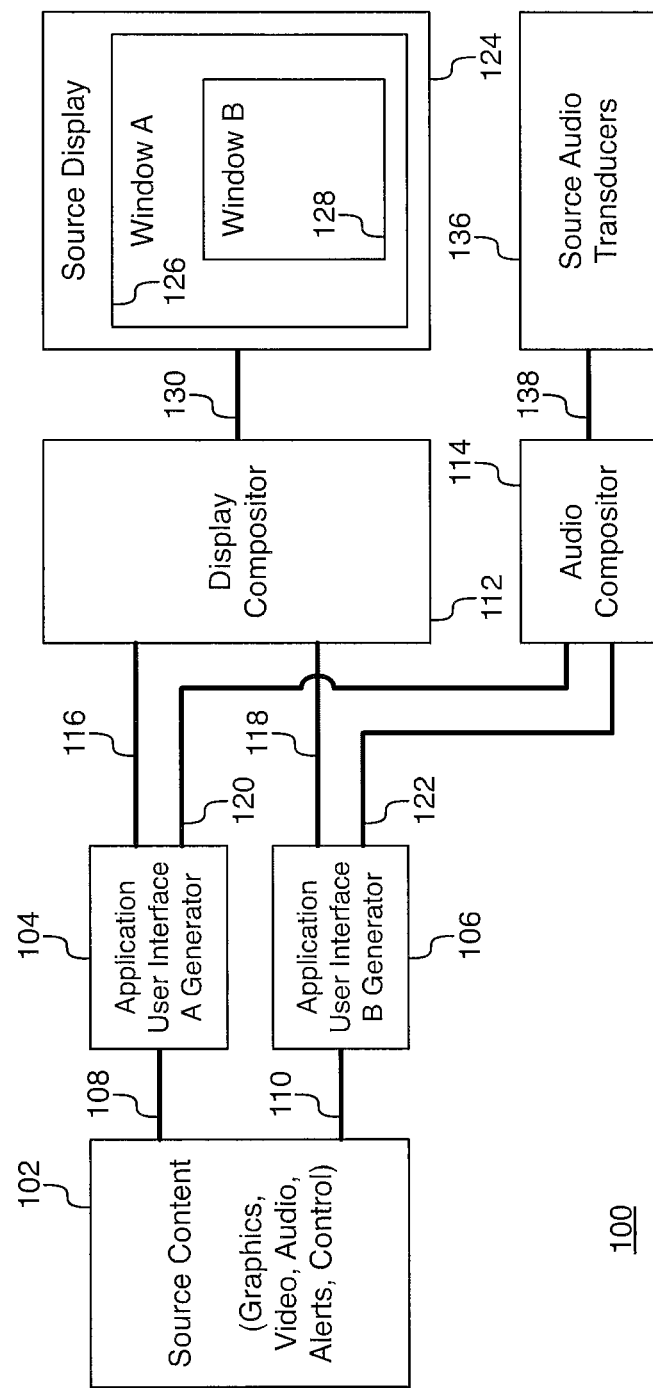
FIG. 1 is a schematic representation of a system for generating an application user interface.

A system and method for forwarding an application user interface from a first computing platform to a second computing platform. The application user interface is generated using source content. The application user interface is encoded into two or more encoded content streams where the two or more encoded content streams contain source content representable as the application user interface and composition metadata associated with the application user interface. The two or more encoded content stream are sent to the second computing platform. The two or more encoded content streams are received where the two or more encoded content streams contain information reproducible as the application user interface. The two or more encoded content streams are decoded. The application user interface is generated using the two or more decoded content streams and composition metadata associated with the two or more decoded content streams.

Many computing devices generate relatively sophisticated application user interfaces that may include a combination of many different types of source content including rendered graphics, motion video, audio and control information. The application user interface may also control external indicators including vibration mechanisms and indicator lights. For example, the application user interface for an email client may cause a small vibration whenever an email is received and then toggle an indicator light on/off until the user views the received email. Computing devices may generate more than one application user interface concurrently. For example, a personal computer may concurrently execute multiple applications including an email client, a web browser and a video player. Each application may have an associated application user interface that is composited and presented concurrently with other application user interfaces. A display attached to the personal computer may present a composited version of each application user interface in a window where some of the windows associated with each application user interface may overlap. An audio compositor may composite, or mix, audio associated with each application user interface and reproduce the composited audio utilizing audio transducers. Other computing devices, for example, mobile phones, are capable of executing multiple applications in a similar way to that described above.

A compression system may transmit the composited graphics and the composited audio associated with the application user interfaces from a first platform to a second platform (a.k.a. computing platforms or computing devices). The second platform may present a composited version of the combined application user interfaces generated on the first platform. Alternatively, each application user interface may be independently transmitted from the first platform to the second platform allowing the second platform to composite each application user interface. For example, the composited graphical version of an application user interface on a first platform may include a video player and an email client where the email client is partially obscuring the video player. The compression system transmits to the second platform that presents the received application user interface in a second user interface that will show the email client partially obscuring the video player. The alternative system may transmit the application user interface for the email client and the video player independently allowing the second user interface to determine how to composite the two application user interfaces. The alternative system may allow the first platform to selectively transmit the email client and/or the video player application user interface to the second platform.

FIG. 1 is a schematic representation of a system for generating an application user interface. The system 100 may include source content 102 that comprises, for example, rendered graphics, video, audio, alerts, notifications and control information. The source content 102 may be utilized to generate an application user interface. An application user interface may be associated with applications such as, for example, a game, an email client and a video player. A game may include source content 102 comprising of rendered graphics, audio and user control inputs. The source content 102 for the game may include, for example, additional metadata describing the resolution of the rendered graphics. For example, the game may be rendered utilizing 1280 horizontal and 720 vertical pixels. The source content 102 for an email client may include rendered graphics, audio, user input and control information. The control information related to an email client may indicate to flash a light when a new email has been received. The light may be part of a computing device, for example, a mobile phone.

An application user interface generator (104 and 106) may utilize a subset of the source content (108 and 110) to generate an application user interface associated with a user application. The application user interface A generator 104 and the application user interface B generator 106 may utilize a different subset of the source content (108 and 110) to generate respective application user interfaces. The example application user interface generator (104 and 106) may generate graphical content (116 and 118) utilized by a display compositor 112 and audio content (120 and 122) utilized by an audio compositor 114. The display compositor 112 may also be referred to as a window manager, composition manager or windowing system. The display compositor 112 may combine the graphical content (116 and 118) creating composited graphics 130 for presentation on a source display 124. The graphical content (116 and 118) may include, for example, rendered graphics, video and graphical composition metadata, or composition metadata. The graphical composition metadata may include, for example, the resolution of the rendered graphics as described above and may specify a viewport of the application user interface, or sub-region, to be presented. Graphical composition metadata may also be based on popular standardized graphics APIs such as, for example, the EGL (Native Platform Graphics Interface) format standardized by The Khronos Group. The source display 124 may present the composited graphics 130 showing a window A 126 generated by the application user interface A generator 104 and a window B 128 generated by the application user interface B generator 106. A display application, not shown, may indicate to the display compositor 112 the relative location of the window (126 and 128) and the z-order of the window (126 and 128) in the composited graphics 130.

The audio compositor 114 may combine, or mix, the audio content (120 and 122) creating composited audio 138 for presentation utilizing source audio transducers 136. The audio content (120 and 122) may include, for example, audio and audio composition metadata, or composition metadata. The audio composition metadata may include volume and muting information. An audio application, not shown, may indicate to the audio compositor 114 the relative volume level of the audio content (120 and 122) in the composited audio 138.

Figure 2:
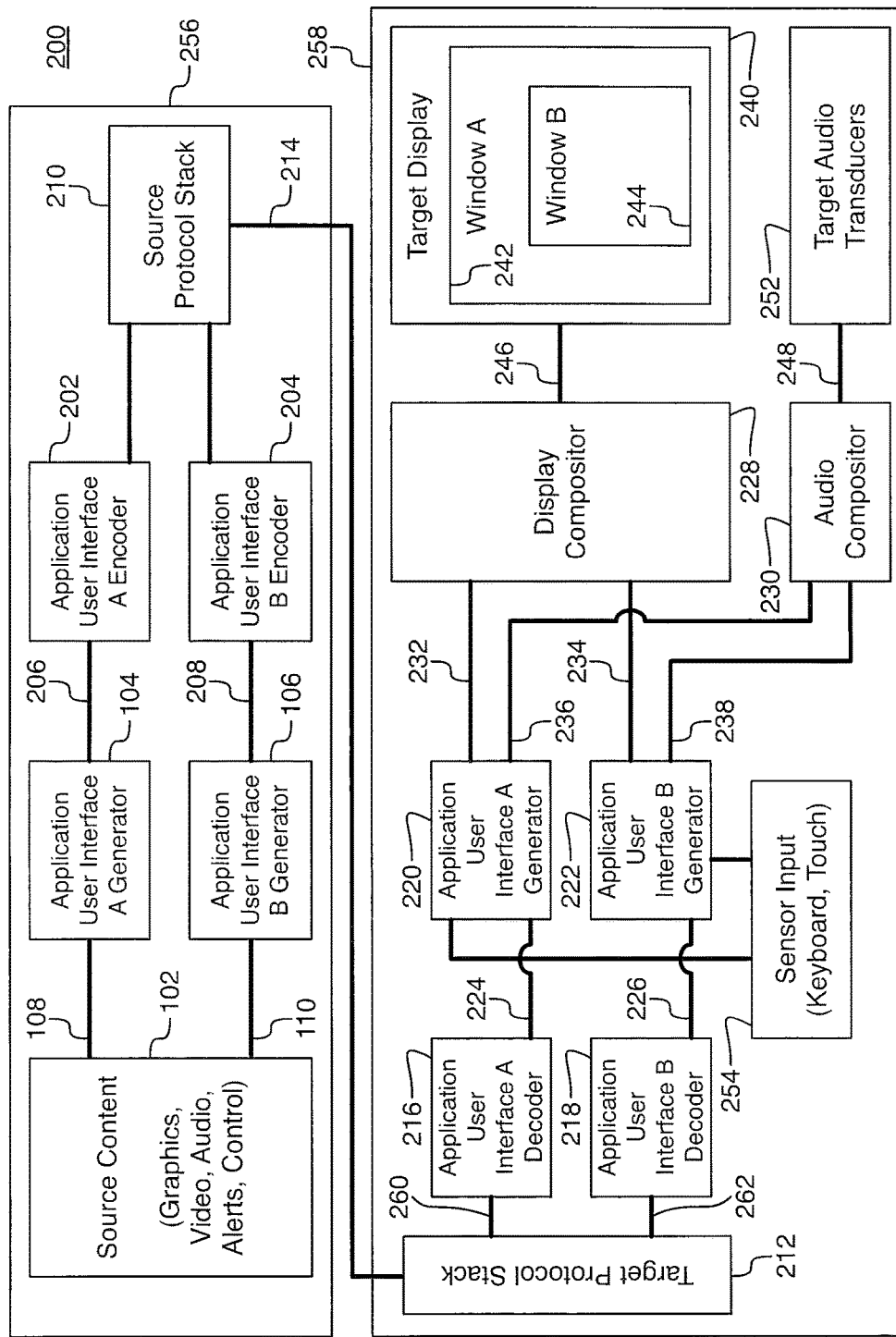
FIG. 2 is a schematic representation of a system for forwarding an application user interface.

FIG. 2 is a schematic representation of a system for forwarding an application user interface. The system 200 may include a first computing platform 256 and a second computing platform 258. The first computing platform 256 and the second computing platform 258 may be executed on separate computing devices. For example, the first computing platform 256 may be executed on a mobile phone while the second computing platform 258 may be executed on a laptop computer. The mobile phone executing the first computing platform 256 may utilize a different operating system than the laptop computer executing the second computing platform 258. In another example, both the first computing platform 256 and the second computing platform 258 may be executing on the same computing device. The first computing platform 256 and the second computing platform 258 may comprise the same, similar or different central processing units (CPUs) and the same, similar or different graphics processing units (GPUs).

The first computing platform 256 may include the source content 102 and the application user interface generators (104 and 106) described abovewith reference to FIG. 1. The application user interface content (206 and 208) may be sent, or redirected, from the application user interface generators (104 and 106) to an application user interface encoder (202 and 204). The application user interface content (206 and 208) may comprise multiple outputs including, for example, the graphical content (116 and 118) and the audio content (120 and 122) described in FIG. 1. In another alternative, the application user interface content (206 and 208) may comprise a single output combining the graphical content (116 and 118) and the audio content (120 and 122). The application user interface encoder (202 and 204) may encode the application user interface content (206 and 208) for transport utilizing a source protocol stack 210 where additional transport metadata may be added for decoding on the second computing platform 258. Encoding the application user interface content (206 and 208) may include additional processing, for example, reducing the redundancy and compressing the application user interface content (206 and 208). The additional transport metadata may include, for example, initialization instructions, synchronization information, timing information, error correction codes, retransmission requests, or other similar transport metadata. The encoding may interleave the application user interface content (206 and 208) information with the additional transport metadata.

The application user interface encoder (202 and 204) may encode rendered graphics in a similar fashion to that disclosed in U.S. application Ser. No. 13/893025, which is incorporated herein by reference, except that in the event of any inconsistent disclosure or definition from the present specification, the disclosure or definition herein shall be deemed to prevail. For example, a source graphics renderer may receive a source graphics command stream, encoded for rendering by a source graphics component using a source graphics semantic, where the source graphic command stream contains graphical information renderable as a graphical image. The source graphics renderer may process the received source graphics command stream to generate a processed graphics stream where the processed graphics stream contains equivalent graphical information to the graphical information contained in the source graphics command stream. A source redirector may encode the processed graphics stream to generate a source formatted graphics stream. The source protocol stack may send the source formatted graphics stream to a target graphics component where the source formatted graphics stream is convertible to a target graphics semantic renderable as a graphical image by the target graphics component. A target redirector may receive a target formatted graphics stream, encoded using an intermediate graphic semantic, where the target formatted graphics stream contains graphical information renderable as a graphical image. The target redirector may decode the target formatted graphics stream. The target redirector may process the decoded target formatted graphics stream to generate a target graphics command stream, encoded for rendering by a target graphics component using a target graphics semantic, where the target command stream contains equivalent graphical information contained in the target formatted graphics stream.

Many computing devices contain relatively sophisticated processors that may include both a central processing unit (CPU) and a graphics processing unit (GPU). Different vendors may design and produce GPUs where the application programming interface (API) is usually standardized in order to simplify application development. Popular standardized graphics APIs may include OPENGL (Open Graphics Library), OPENGL ES, OPENCL and OPENVG formats standardized by The Khronos Group. OPENGL® is a registered trademark of Silicon Graphics, Inc. of Mountain View, California. Applications may utilize a standardized graphics API, or graphics API, to render graphical images for display where the rendering is accelerated by the GPU. Alternatively, the CPU may perform the rendering in software. The graphics API does not have to be standardized. An application utilizing the graphics API sends commands, or a graphics command stream, to the GPU that in turn renders a graphical image into a memory buffer. The graphics API allows the GPU to return responses to the application. The amount of data contained within the graphics command stream is typically much lower than the amount of data utilized by the GPU to render the graphical image or the rendered graphical image.

When the target device has a GPU, the graphics command stream created by the application executing on the source device may be rendered by the GPU on the target device. In this case the rendering occurs on the target device as compared to rendering and video encoding the result on the source device. The amount of data contained within the graphics command stream is typically much lower than the amount of data utilized by the GPU to render the graphical image or the rendered graphical image. Encoding and transmitting the graphics command stream for rendering on a target device may reduce the latency and provide a better quality rendering when compared to the results of using a video encoder. Transmitting the graphics command stream may result in less network utilization than the compressed video stream.

A source protocol stack 210 may transmit the encoded application user interface content to the second computing platform 258 as a protocol stream 214. The source protocol stack 210 may be, for example, a Transmission Control Protocol / Internet Protocol (TCP/IP) stack. The protocol stream 214 may be delivered using a TCP or a User Datagram Protocol (UDP). When UDP is used as the transport mechanism for the encoded application user interface content, the encoded application user interface content may include transport metadata that both the first computing platform 256 and the second computing platform 258 may use to determine packet order or to identify missing packets in the protocol stream 214. The protocol stream 214 may be transported using wireless or wired networks that may include, for example, Ethernet, WI-FI® or BLUETOOTH®. WI-FI® is a registered trademark of Wireless Ethernet Compatibility Alliance, Inc. of Austin, Tex. BLUETOOTH® is a registered trademark of the Bluetooth Special Interest Group of Kirkland, Washington. In an example embodiment the second computing platform 258 may comprise one or more processes executing on the same computing device as the first computing platform 256 in which case the protocol stream 214 may be transported by a communication method in the operating system such as, for example, an inter-process messaging mechanism (a.k.a. message passing).

The application user interface content may predominately flows forward from the first computing platform 256 to the second computing platform 258 where the application user interface content contains commands and data that may be generated as an application user interface on the second computing platform 258. Application user interface content may also flow backwards from the second computing platform 258 to the first computing platform 256 when the application user interface content contains responses and data. For example, the application user interface generator (104 and 106) may send a command that requests the current background color. The response containing the current background color may be returned via the source protocol stack 210. The application user interface content may flow in both directions so each of the subcomponents handling application user interface content described herein may handle bidirectional communication. For example, the application user interface encoder (202 and 204) may receive and decode the encoded application user interface content where decoding may be similar to the decoding in an application user interface decoder (216 and 218) described below.

A target protocol stack 212 executing as part of the second computing platform 258 receives the protocol stream and outputs encoded application user interface content, or encoded content streams (260 and 262). The encoded content streams (260 and 262) contain information reproducible as application user interfaces. The target protocol stack 212 may provide the same or similar networking services as the source protocol stack 210. For example both the target protocol stack 212 and the source protocol stack 210 may utilize TCP/IP. The encoded content streams (260 and 262) may be identical to the encoded application user interface content sent from the first computing platform 256, for example, when the protocol stream 214 contains no transmission errors.

The application user interface decoder (216 and 218) may decode the encoded content streams (260 and 262) and process the transport metadata contained therein. For example, the application user interface decoder (216 and 218) may use the transport metadata to initialize the internal decoding states, apply error correction codes, reorder the stream into the correct sequence or request retransmission of missing content. The application user interface decoder (216 and 218) may decode and reverse the processing performed by the application user interface encoder (202 and 204). For example, the application user interface decoder (216 and 218) may decompress graphics content that may have been compressed by the application user interface encoder (202 and 204) in order to restore the graphical content.

The application user interface decoder (216 and 218) sends decoded application user interface content, or decoded content streams (224 and 226) to the application user interface generator (220 and 222). The decoded content streams (224 and 226) may be equivalent to the subset of the source content (108 and 110), for example, when the protocol stream 214 contains no transmission errors. The decoded content streams (224 and 226) may include equivalent source content 102 that comprises, for example, rendered graphics, video, audio, alerts, notifications and control information. The decoded content streams (224 and 226) may be utilized to generate an application user interface. An application user interface may be associated with an application such as, for example, a game, an email client and a video player. A game may include decoded content streams (224 and 226) comprising of rendered graphics, audio and user control inputs. The decoded content streams (224 and 226) for the game may include additional information describing the resolution of the rendered graphics. For example the game may be rendered utilizing 1280 horizontal and 720 vertical pixels. The source content for an email client may include rendered graphics, audio, user input and control information. The control information related to an email client may indicate to flash a light when a new email has been received. The light may be connected to a computing device, for example, a mobile phone.

The application user interface generator (220 and 222) may utilize the decoded content streams (224 and 226) to generate an application user interface associated with a user application. The example application user interface generator (220 and 222) may generate graphical content (232 and 234) utilized by a display compositor 228 and audio content (236 and 238) utilized by an audio compositor 230. The display compositor 228 may also be referred to as a window manager or a composition manager. The display compositor 228 may combine the graphical content (232 and 234) creating composited graphics 246 for presentation on a target display 240. The graphical content (232 and 234) may include, for example, rendered graphics, video and graphical composition metadata, or composition metadata. The graphical composition metadata may include, for example, the resolution of the rendered graphics, viewport information and EGL as described above. The viewport information may include one or more application user interfaces each presenting, for example, rendered graphics, video and/or the associated audio. The target display 240 may present the composited graphics 246 showing a window A 242 associated with the application user interface A generator 220 and a window B 244 associated with the application user interface B generator 222. A display application, not shown, may indicate to the display compositor 228 the relative location of the window (242 and 244) and the z-order of the window (242 and 244) in the composited graphics 246.

The audio compositor 230 may combine, or mix, the audio content (236 and 238) creating composited audio 248 for presentation utilized target audio transducers 252. The audio content (236 and 238) may include, for example, audio and audio composition metadata, or composition metadata. The audio composition metadata may include volume and muting information. An audio application, now shown, may indicate to the audio compositor 230 the relative volume level of the audio content (236 and 238) in the composited audio 248.

Both the display compositor 228 and audio compositor 230 can independently process separate input content. For example, the display compositor 228 may position window A 242 and window B 244 independently within the target display. The display application may select the position and z-order of each window (242 and 244). The display compositor 228 may composite additional windows, now shown, generated by applications executing in the second computing platform 258. Each compositor may process each compositor input independently to produce a composited output. Some compositor inputs may be created on the first computing platform 256 and some compositor inputs may be created on the second computing platform 256.

A sensor input 254 may provide control information to the application user interface generator (220 and 222). The sensor input 254 may include, for example, a keyboard, mouse or a touch input. The sensor input 254 may modify the application user interface content on the second computing device 258. For example, the sensor input 256 may modify the location of window A 242 on the target display 240. The sensor input 254 may be sent to the first computing device 256 that modifies the source content 102. The sensor input 256 may cause, for example, a video player to pause. The source content 102 receives a control signal from the sensor input 256 and pauses the video stream.

Figure 3:
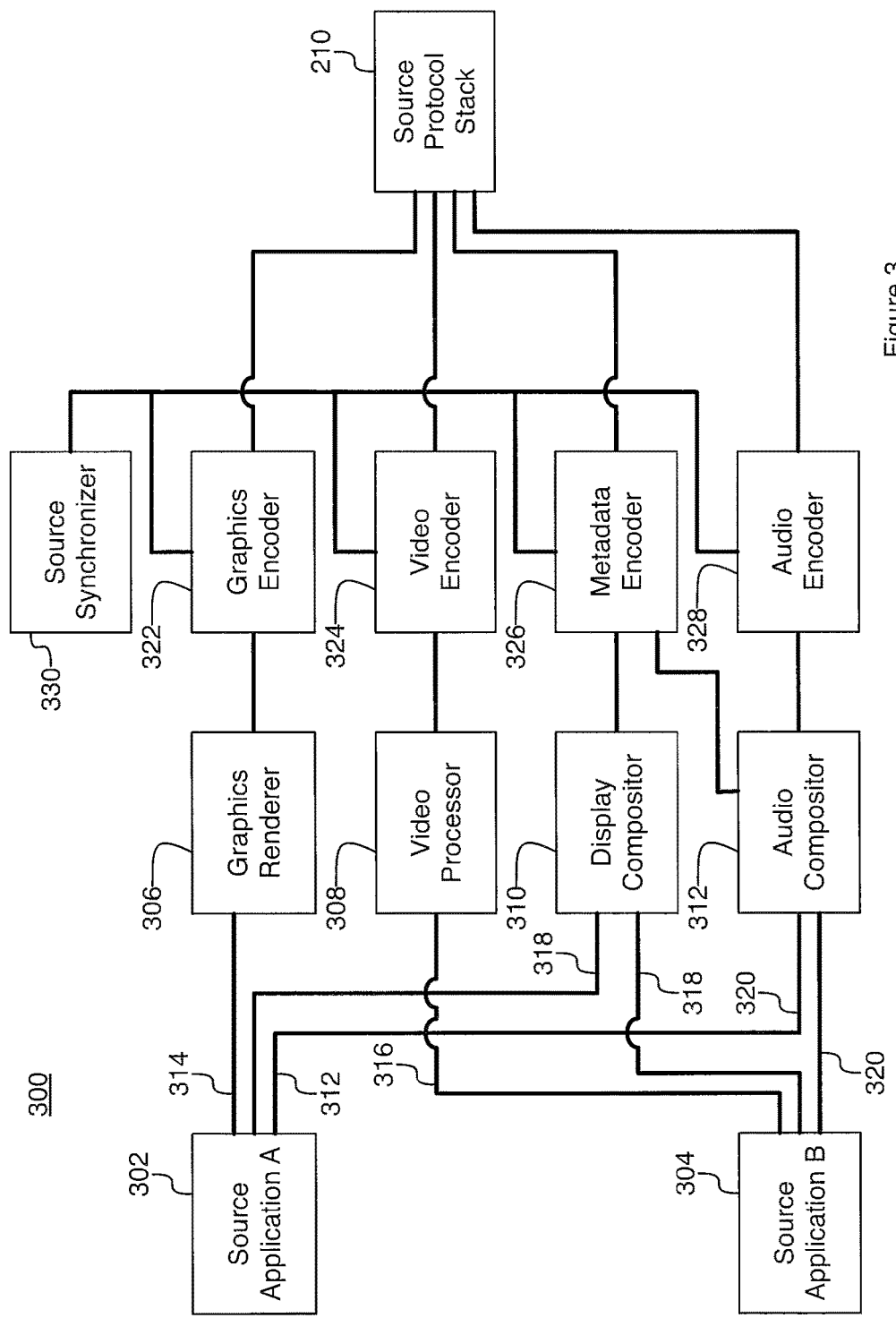
FIG. 3 is a further schematic representation of a system for forwarding an application user interface.

FIG. 3 is a further schematic representation of a system for forwarding an application user interface. The system 300 may comprise an alternative example of the first computing platform 256. A source application (302 and 304) may generate the application user interface content (206 and 208) utilizing processing components that may include, for example, a graphics renderer 306, a video processor 308, a display compositor 310 and an audio compositor 312. Source application A 302 may be, for example, a game that comprises rendered graphics and sound. Source application A 302 may generate rendered graphics by sending a graphics command stream 314 to the graphics renderer 306. The graphics command stream 314 may contain commands and data that may be processed by the graphics renderer 306. The source application A 302 may send display composition metadata 318 to the display compositor 310. The display compositor 310 may utilize the display composition metadata 318, for example, to position the graphics rendered by the graphics renderer 306. Display composition metadata 318 may include EGL commands as described above. Source application A 302 may send an audio stream 320 to the audio compositor 312. Source application B 304 may be, for example, a video player that comprises motion video and sound. The source application B 304 may send a video stream 316 to the video processor 308, send display composition metadata 318 to the display compositor 310 and send an audio stream 320 to the audio compositor 312. The combination of source application (302 and 304), the graphics renderer 306, the video processor 308, the display compositor 310 and the audio compositor 312 may provide the equivalent functionality of the source content 102 and the application user interface generator (104 and 106).

A graphics encoder 322, a video encoder 324, a metadata encoder 326, an audio encoder 328 and a source synchronizer 330 may provide the equivalent functionality of the application user interface encoder (202 and 204) where each output may be encoded for transport utilizing the source protocol stack 210. The metadata encoder 326 may encode associated composition metadata from one or more application user interface generators (104 and 106). The associated metadata may include, for example, window position information and EGL commands provided by the display compositor 310, and volume information provided by the audio compositor 312. In an alternative system, associated composition metadata is combined with the data instead of utilizing a metadata encoder 326. For example, the audio compositor 312 may combine, or multiplex, audio samples with volume metadata. The source synchronizer 330 may be used to generate synchronization information including, for example, timestamps that may be used by the application user interface decoder (216 and 218) to synchronize the application user interface content in the second computing platform 258.

Figure 4:
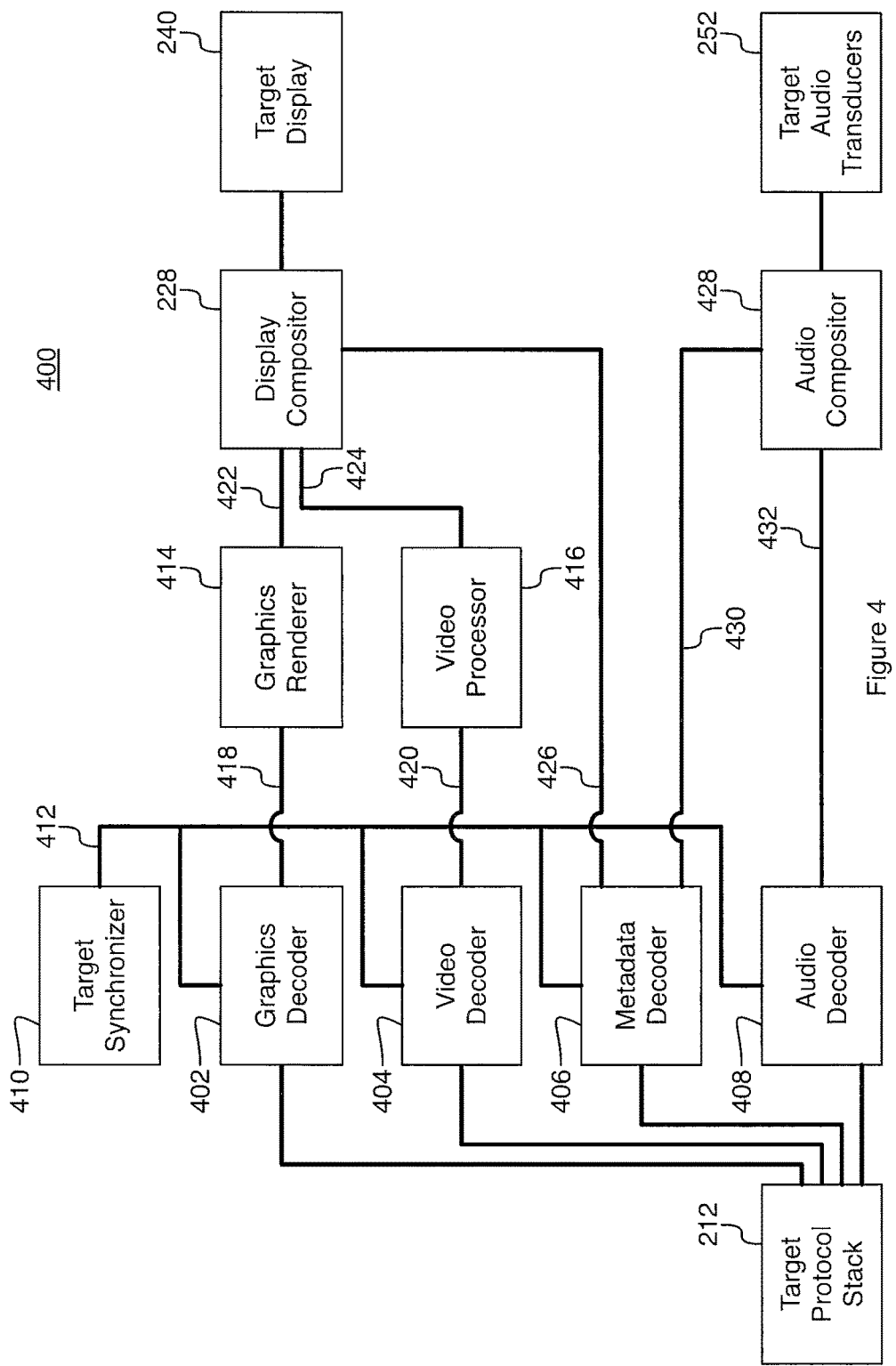
FIG. 4 is a further schematic representation of a system for forwarding an application user interface.

FIG. 4 is a further schematic representation of a system for forwarding an application user interface. The system 400 may include an alternative example of the second computing platform 258. A target protocol stack 212 executing as part of the second computing platform 258 receives the protocol stream and outputs encoded content streams (260 and 262). The application user interface decoders (216 and 218) may decode the encoded content streams (260 and 262) utilizing processing components that may include, for example, a graphics decoder 402, a video decoder 404, a metadata decoder 406, an audio decoder 408 and a target synchronizer 410. The target synchronizer 410 may decode synchronization information that may be used by the application user interface decoders (216 and 218) to synchronize the application user interface content in the second computing platform 258.

A graphics renderer 414 may render graphics commands and data decoded by the graphics decoder 402. For example, the graphics renderer 414 may render graphical images 422 associated with a game application. A video processor 416 may process a video stream decoded by the video decoder 404. The video stream may be compressed video that is processed into a sequence of images 424 by the video processor 416. The metadata decoder 406 may decode display composition metadata 426 utilized by the display compositor 228. The display compositor 228 may composite the graphical images 422 and the sequence of images 424 utilizing the display composition metadata 426 for display on the target display 240. The audio decoder 408 may send audio data 432 to the audio compositor 428. The metadata decoder 406 may decode audio composition metadata 430 utilized by the audio compositor 428. The audio compositor 428 may composite the audio data 432 utilizing the audio composition metadata 430 for reproduction on the target audio transducers 252.

FIG. 5A is a further schematic representation of a system for forwarding an application user interface. The system may include a first computing platform 256. The first computer platform 256 may operate in a manner similar or equivalent to the system 100 shown in FIG. 1 where the all the user interface content is presented on the source display 124. The display compositor 112 composites the output of the application user interface generator (104 and 106) creating windows (126 and 128) on the source display 124. A keyboard 504 input may provide control information to the application user interface generator (104 and 106). The keyboard 504 input may be considered as a sensor input 254.

FIG. 5B is a further schematic representation of a system for forwarding an application user interface. The system may include the first computing platform 256 and a second computing platform 258. The first computer platform 256 may present window B 238 on the source display 124 and window A 242 is presented on the target display 240 on the second computing platform 258. In one example, both windows (126 and 128) may be presented on the source display 124 as shown in FIG. 5A and then one window, window A 242 is encoded and sent to the target display 240 as shown in FIG. 5B. A user input associated with the first computing platform 256 or the second computing platform 258 may cause window A 242 to be presented on (or transferred to) the second computing platform 258. Window A 242 and window B 128 may be independently generated and displayed on either the first computing device 256 or the second computing device 258. An application user interface encoder 502 encodes the output of the application user interface A generator 104 and sends the output to the second computing device 258. The source protocol stack 210 transmitting the encoded application user interface content via the protocol stream 214 is not shown but may be present. An application user interface decoder 506 decodes the encoded application user interface content. The target protocol stack 212 receiving the protocol stream 214 is not shown but may be present. A keyboard 508 may provide sensor input to the application user interface B generator 220. The keyboard 504 may also provide sensor input to the application user interface B generator 220.

Figure 5C:
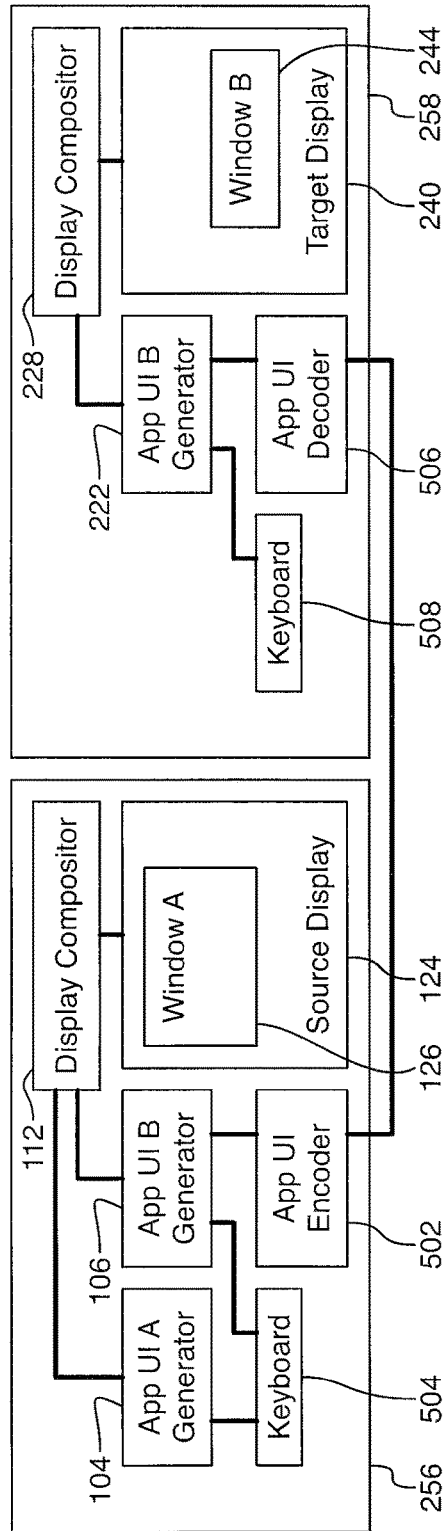
FIG. 5C is a further schematic representation of a system for forwarding an application user interface.

FIG. 5C is a further schematic representation of a system for forwarding an application user interface. The system may include a first computing platform 256 and a second computing platform 258. The first computer platform 256 may present window A 126 on the source display 124 where window B 244 is presented on the target display 240 on the second computing platform 258. Window A 126 and window B 244 may be independently generated and displayed on either the first computing device 256 or the second computing device 258. An application user interface encoder 502 encodes the output of the application user interface B generator 106 and sends the output to the second computing device 258. The source protocol stack 210 transmitting the encoded application user interface content via the protocol stream 214 is not shown but may be present. An application user interface decoder 506 decodes the encoded application user interface content. The target protocol stack 212 receiving the protocol stream 214 is not shown but may be present. The keyboard 508 may provide sensor input to the application user interface A generator 222. The keyboard 504 may also provide sensor input to the application user interface A generator 222

Figure 5D:
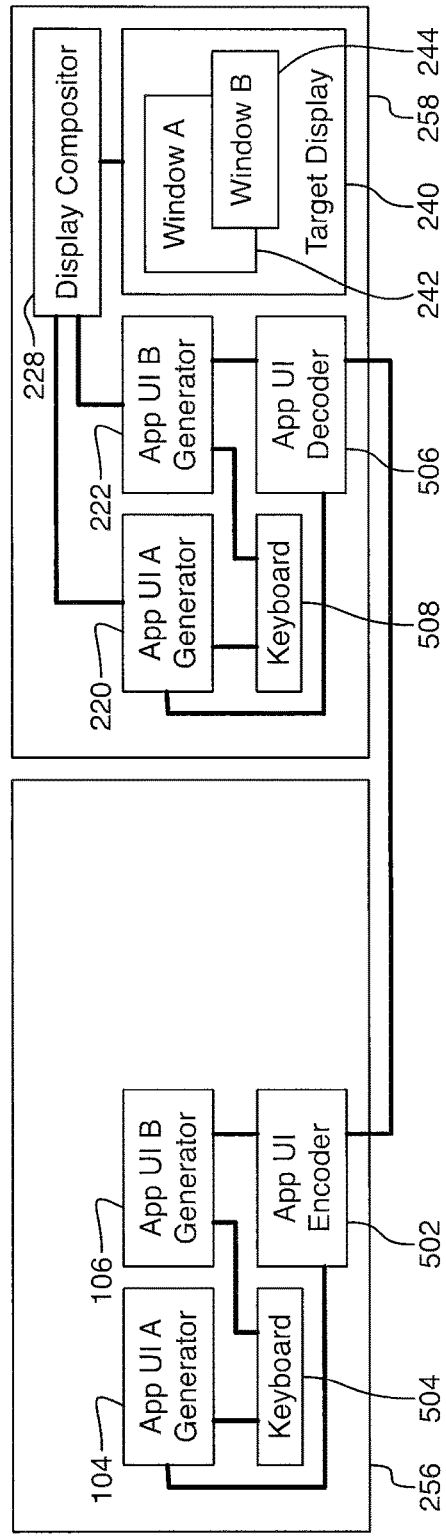
FIG. 5D is a further schematic representation of a system for forwarding an application user interface.

FIG. 5D is a further schematic representation of a system for forwarding an application user interface. The system may include a first computing platform 256 and a second computing platform 258. The system shown in FIG. 5D may be equivalent to the system 200 shown in FIG. 2 where the all the user interface content is presented on the target display 240. Window A 126 and window B 244 may both be presented on the target display 240 on the second computing platform 258. Window A 126 and window B 244 may be independently generated and displayed on either the first computing device 256 or the second computing device 258. An application user interface encoder 502 encodes the output of the application user interface generator (104 and 106) and sends the output to the second computing device 258. The source protocol stack 210 transmitting the encoded application user interface content via the protocol stream 214 is not shown be may be present. An application user interface decoder 506 decodes the encoded application user interface content. The target protocol stack 212 receiving the protocol stream 214 is not shown but may be present. The keyboard 508 may provide sensor input to the application user interface generator (220 and 222). The keyboard 504 may also provide sensor input to the application user interface generator (104 and 106).

Figure 6:
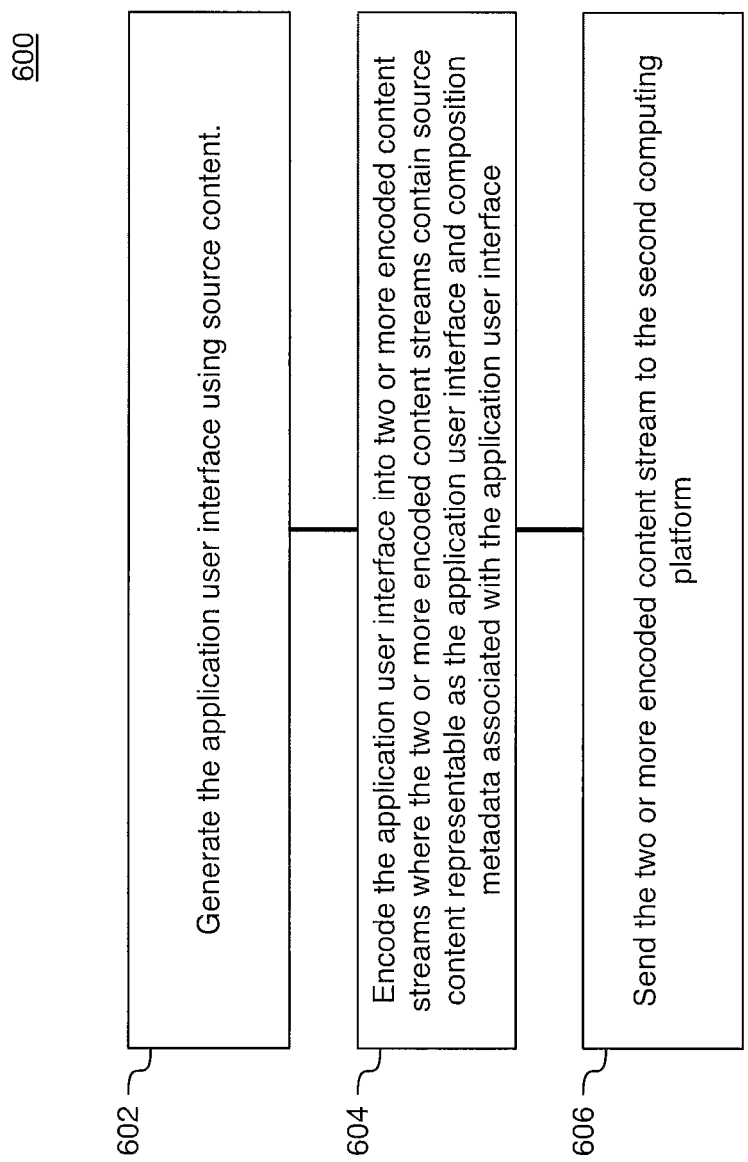
FIG. 6 is a representation of a method for forwarding an application user interface.

FIG. 6 is a representation of a method for forwarding an application user interface from a first computing platform to a second computing platform. The method 600 may be, for example, implemented using the first computing platform 256 of system 200 described herein with reference to FIG. 2. The method 600 includes generating the application user interface using source content 602. The generated application user interface may be encoded into two or more encoded content streams where the two or more encoded content streams contain source content representable as the application user interface and composition metadata associated with the application user interface 604. The two or more content streams may be sent to the second computing platform 606.

Figure 7:
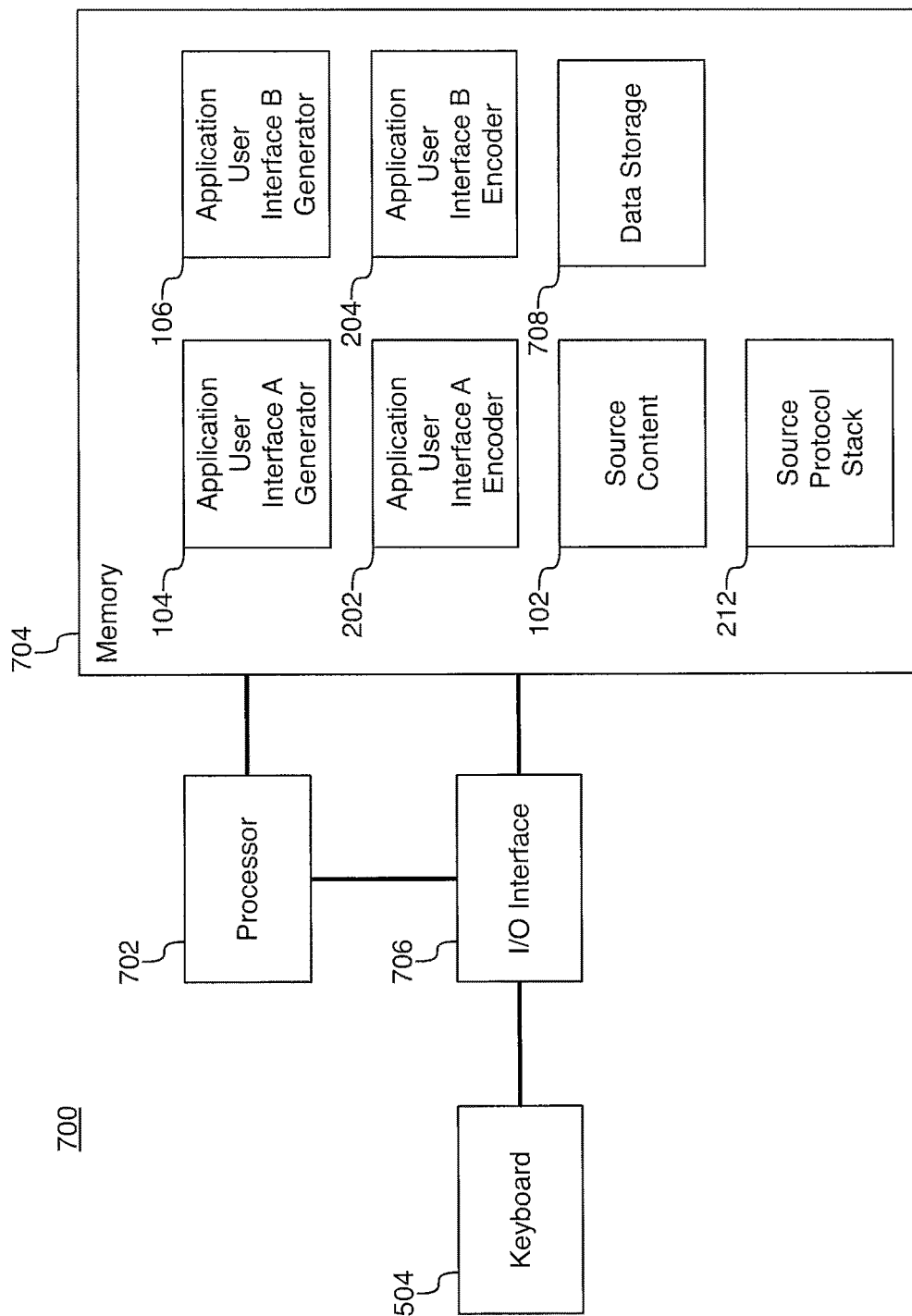
FIG. 7 is a further schematic representation of a system for forwarding an application user interface.

FIG. 7 is a schematic representation of a system for 700. The system 700 comprises a processor 702, memory 704 (the contents of which are accessible by the processor 702) and an I/O interface 706. The memory 704 may store instructions which when executed using the process 702 may cause the system 700 to render the functionality associated with forwarding an application user interface from a first computing platform to a second computing platform as described herein. For example, the memory 704 may store instructions which when executed using the processor 704 may cause the system 700 to render the functionality associated with the application user interface generator (104 and 106), the application user interface encoder (202 and 204), the source content 102 and the source protocol stack 210 as described herein. In addition, data structures, temporary variables and other information may store data in data storage 708.

The processor 702 may comprise a single processor or multiple processors that may be disposed on a single chip, on multiple devices or distributed over more that one system. The processor 702 may be hardware that executes computer executable instructions or computer code embodied in the memory 704 or in other memory to perform one or more features of the system. The processor 702 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 704 may comprise a device for storing and retrieving data, processor executable instructions, or any combination thereof. The memory 704 may include non-volatile and/or volatile memory, such as a random access memory (RAM), a read-only memory (ROM), an erasable programmable read-only memory (EPROM), or a flash memory. The memory 704 may comprise a single device or multiple devices that may be disposed on one or more dedicated memory devices or on a processor or other similar device. Alternatively or in addition, the memory 704 may include an optical, magnetic (hard-drive) or any other form of data storage device.

The memory 704 may store computer code, such as the application user interface generator (104 and 106), the application user interface encoder (202 and 204), the source content 102 and the source protocol stack 210 as described herein. The computer code may include instructions executable with the processor 702. The computer code may be written in any computer language, such as C, C++, assembly language, channel program code, and/or any combination of computer languages. The memory 704 may store information in data structures including, for example, composition metadata.

The I/O interface 706 may be used to connect devices such as, for example, the keyboard 504 and to other components of the system 700.

All of the disclosure, regardless of the particular implementation described, is exemplary in nature, rather than limiting. The system 700 may include more, fewer, or different components than illustrated in FIG. 7. Furthermore, each one of the components of system 700 may include more, fewer, or different elements than is illustrated in FIG. 7. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

Figure 8:
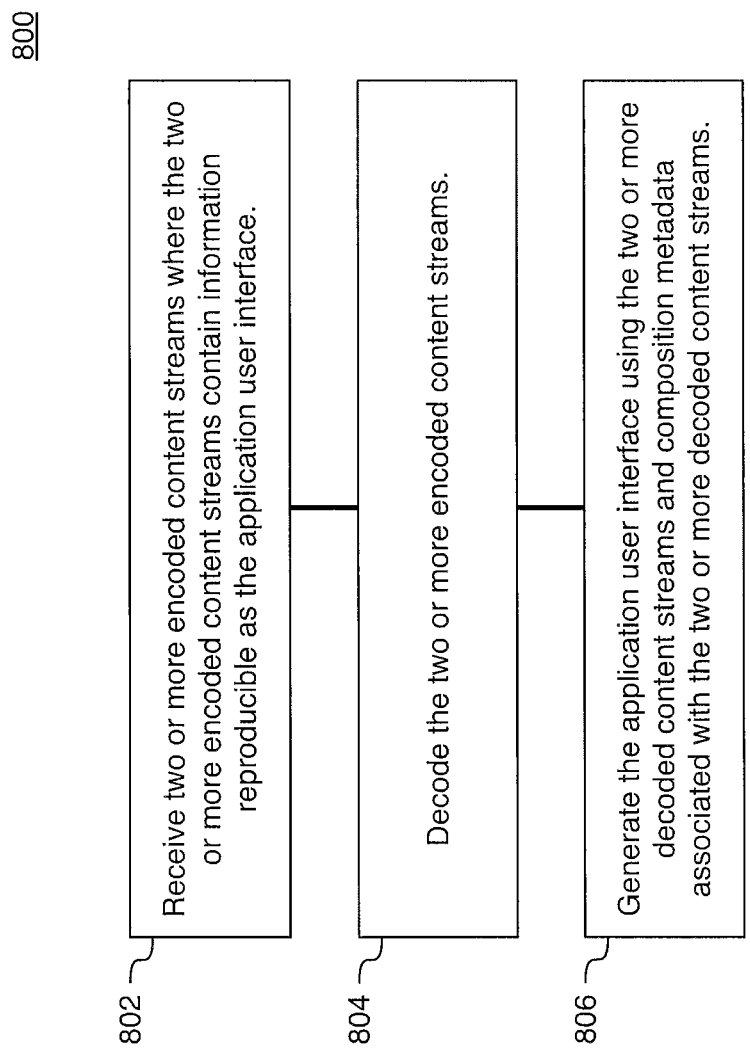
FIG. 8 is a representation of a method for forwarding an application user interface.

FIG. 8 is a representation of a method for forwarding an application user interface from a first computing platform to a second computing platform. The method 800 may be, for example, implemented using the second computing platform 258 of system 200 described herein with reference to FIG. 2. The method 800 includes forwarding two or more encoded content streams where the two or more encoded content streams (260 and 262) contain information reproducible as an application user interface 802. The two or more encoded content streams (260 and 262) may be decoded 804. The application user interface may be generated using the two or more decoded content streams (224 and 228) and composition metadata associated with the two or more content streams 806.

Figure 9:
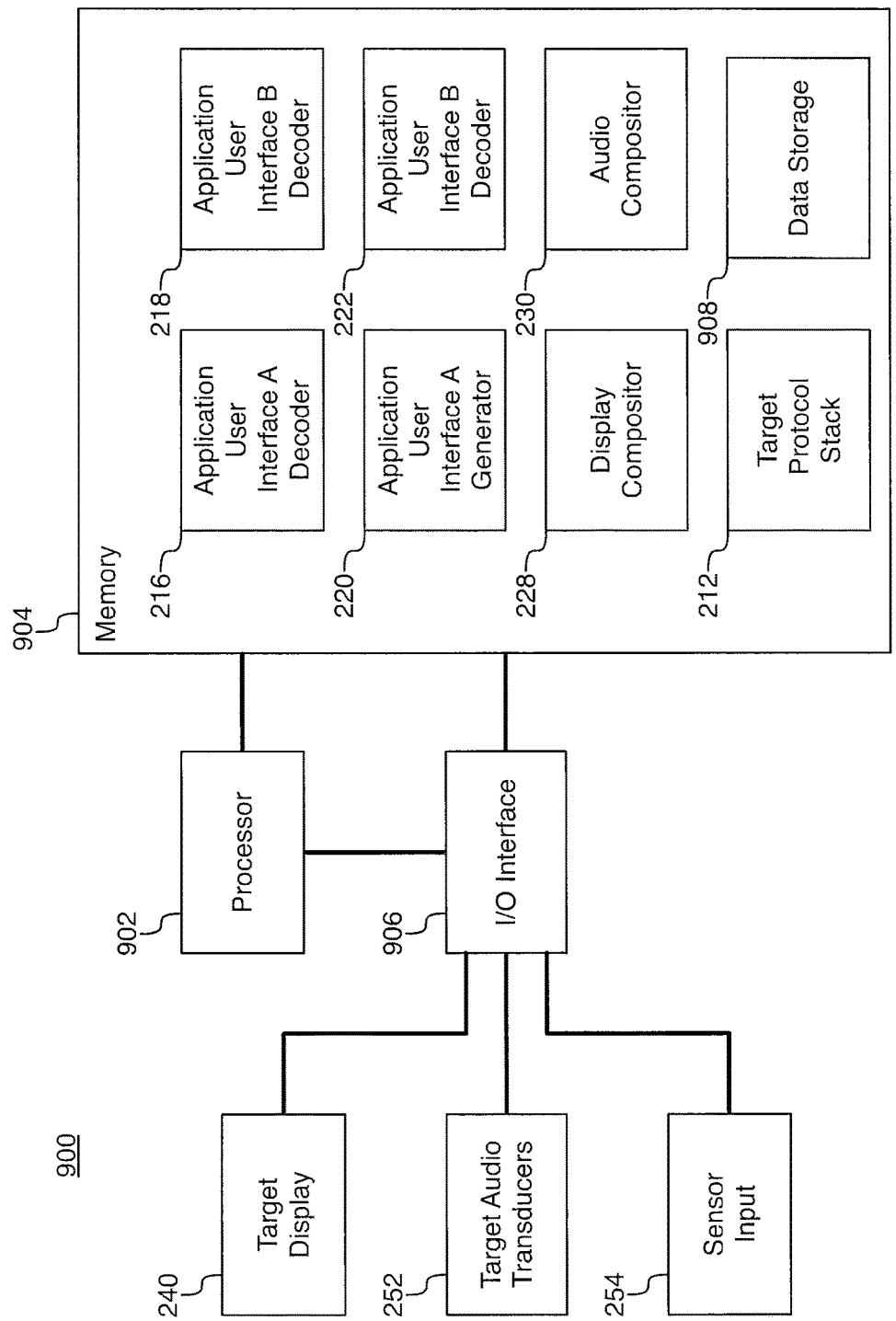
FIG. 9 is a further schematic representation of a system for forwarding an application user interface.

FIG. 9 is a schematic representation of a system for 900. The system 900 comprises a processor 902, memory 904 (the contents of which are accessible by the processor 902) and an I/O interface 906. The memory 904 may store instructions which when executed using the process 902 may cause the system 900 to render the functionality associated with forwarding an application user interface from a first computing platform to a second computing platform as described herein. For example, the memory 904 may store instructions which when executed using the processor 904 may cause the system 900 to render the functionality associated with the application user interface decoder (216 and 218), the application user interface generator (220 and 222), the display compositor 228, the audio compositor 230 and the target protocol stack 212 as described herein. In addition, data structures, temporary variables and other information may store data in data storage 908.

The processor 902 may comprise a single processor or multiple processors that may be disposed on a single chip, on multiple devices or distributed over more that one system. The processor 902 may be hardware that executes computer executable instructions or computer code embodied in the memory 904 or in other memory to perform one or more features of the system. The processor 902 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 904 may comprise a device for storing and retrieving data, processor executable instructions, or any combination thereof. The memory 904 may include non-volatile and/or volatile memory, such as a random access memory (RAM), a read-only memory (ROM), an erasable programmable read-only memory (EPROM), or a flash memory. The memory 904 may comprise a single device or multiple devices that may be disposed on one or more dedicated memory devices or on a processor or other similar device. Alternatively or in addition, the memory 904 may include an optical, magnetic (hard-drive) or any other form of data storage device.

The memory 904 may store computer code, such as the application user interface decoder (216 and 218), the application user interface generator (220 and 222), the display compositor 228, the audio compositor 230 and the target protocol stack 212 as described herein. The computer code may include instructions executable with the processor 902. The computer code may be written in any computer language, such as C, C++, assembly language, channel program code, and/or any combination of computer languages. The memory 904 may store information in data structures including, for example, composition metadata.

The I/O interface 906 may be used to connect devices such as, for example, the target display 240, the target audio transducers 252, the sensor input 254 and to other components of the system 900.

All of the disclosure, regardless of the particular implementation described, is exemplary in nature, rather than limiting. The system 900 may include more, fewer, or different components than illustrated in FIG. 9. Furthermore, each one of the components of system 900 may include more, fewer, or different elements than is illustrated in FIG. 9. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The components of system 700 and system 900 may be identical when the first computing platform 256 and the second computing platform 258 execute on the same computing device. For example, the memory 704 may store instructions which when executed using the processor 702 may cause the system 700 to render the functionality associated with the application user interface decoder (216 and 218), the application user interface generator (220 and 222), the display compositor 228, the audio compositor 230 and the target protocol stack 212 as described herein. In addition, data structures, temporary variables and other information may store data in data storage 908 that may be stored in memory 704.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for on-demand user control have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for forwarding application user interfaces, the method comprising:
   generating a first source content that represents a first application user interface on a first computing platform;
   generating a second source content that represents a second application user interface on the first computing platform;
   encoding the first application user interface and the second application user interface independently into two or more encoded content streams on the first computing platform where the two or more encoded content streams contain composition metadata and information reproducible as a composite application user interface where the composition metadata includes information for compositing graphics content from the two or more encoded content streams for concurrent representation in a display; and
   sending the two or more encoded content streams from the first computing platform to a second computing platform on which the two or more encoded content streams are decodable into two or more decoded independent content streams from which the composite application user interface is compositable based on the composition metadata, the two or more encoded content streams comprising commands based on a graphics API for rendering graphical images accelerated by a GPU (Graphics Processing Unit), where the composite application user interface enables a user to send a command to the first computing platform through an input received on the second computing platform, where the second computing platform includes the GPU capable of rendering the composite application user interface including the graphics content based on the commands and the composition metadata from the two or more encoded content streams to the user.

2. The method of claim 1, where the composition metadata controls rendered appearance and placement of the first application user interface rendered on the second computing platform.

3. The method of claim 1, where encoding the first application user interface and the second application user interface into the two or more encoded content streams includes encoding transport metadata and encoding content of the first application user interface or the second application user interface.

4. The method of claim 3, where the transport metadata includes any one or more of: initialization instructions, synchronization information, timing information, error correction codes and retransmission requests.

5. The method of claim 3, where the encoding comprises applying data compression to content of the first application user interface.

6. The method of claim 1, further comprising generating the first application user interface on the first computing platform by rendering graphics, or processing video and processing the composition metadata.

7. The method of claim 1, further comprising:
rendering a local application user interface on the first computing platform;
rendering the first application user interface; and
compositing the rendered local application user interface and the rendered first application user interface on the first computing platform.

8. The method of claim 1,
where the second application user interface determines how the second computing platform combines the first application user interface and the second application user interface into a single image to render an appearance that the first application user interface and the second application user interface are part of a same scene.

9. A system for forwarding application user interfaces, the system comprising:
a first hardware generator configured to generate a first source content on a first computing platform usable to render a first application user interface;
a second hardware generator configured to generate a second source content on the first computing platform usable to render a second application user interface;
a first hardware encoder and a second hardware encoder configured to encode the first application user interface and the second application user interface respectively into two or more encoded content streams on the first computing platform where the two or more encoded content streams contain composition metadata and information reproducible as a composite application user interface, where the composition metadata includes information for compositing graphics content from the two or more encoded content streams into the composite application user interface; and
a transmitter configured to send the two or more encoded content streams from the first computing platform to a second computing platform in response to user input with the first computing platform, where the two or more encoded content streams are decodable into two or more decoded independent content streams on the second computing platform, and the composite application user interface is compositable from the two or more decoded independent content streams based on the composition metadata, the two or more encoded content streams comprising commands based on a graphics API for rendering graphical images accelerated by a GPU (Graphics Processing Unit),
where the application user interface comprises a program with which a user interacts, and
where the second computing platform includes the GPU capable of rendering the composite application user interface including the graphics content based on the commands and the composition metadata from the two or more encoded content streams to the user.

10. The system of claim 9, where the composition metadata controls placement and view of the first application user interface and specifies a viewport of the first application user interface.

11. The system of claim 9, where the composition metadata includes data controlling display of the first application user interface and a volume level of audio content.

12. The system of claim 9, where encoding the first application user interface and the second application user interface into the two or more encoded content streams includes encoding transport metadata and encoding content of the first application user interface.

13. The system of claim 12, where the transport metadata includes any one or more of: initialization instructions, synchronization information, timing information, error correction codes and retransmission requests.

14. The system of claim 12, where the first hardware encoder is further configured to apply data compression to content of the first application user interface.

15. The system of claim 9, where the first application user interface is generatable by rendering graphics, processing video, processing audio, or synchronizing the two or more encoded content streams for the second computing platform and processing the composition metadata.

16. The system of claim 9, further comprising:
a renderer configured to render a local application user interface;
a renderer configured to render the first application user interface; and
a compositor configured to composite the rendered local application user interface and the rendered first application user interface.

17. The system of claim 9,
where the transmitter includes a first transmitter and a second transmitter to send respective streams of the two or more encoded content streams to the second computing platform;
where the second application user interface determines how the second computing platform combines the first application user interface and the second application user interface into a single image to render an appearance that the first application user interface and the second application user interface are part of one scene.

18. A non-transitory computer readable medium comprising:
computer instructions that are executable to generate a first source content that represents a first application user interface on a first computing platform;
computer instructions that are executable to generate a second source content that represents a second application user interface on the first computing platform;
computer instructions that are executable to encode the first application user interface and the second application user interface independently into two or more encoded content streams on the first computing platform where the two or more encoded content streams contain composition metadata and information reproducible as a composite application user interface, where the composition metadata includes information for compositing graphics content from the two or more encoded content streams into the composite application user interface; and
computer instructions that are executable to cause transmission of the two or more encoded content streams from the first computing platform to a second computing platform where the two or more encoded content streams are decodable into two or more decoded independent content streams on the second computing platform, and the composite application user interface is compositable from the two or more decoded independent content streams based on the composition metadata, the two or more encoded content streams comprising commands based on a graphics API for rendering graphical images accelerated by a GPU (Graphics Processing Unit)

where the composite application user interface enables a user to send a command to the first computing platform through an input received on the second computing platform, and where the second computing platform includes the GPU capable of rendering the composite application user interface including the graphics content based on the commands and the composition metadata from the two or more encoded content streams to the user.

\* \* \* \* \*